United States Patent [19]

Randall et al.

[11] 4,106,487

[45] Aug. 15, 1978

[54] CONTINUOUS STEEPING OF CORN FOR WET PROCESSING TO STARCHES, SYRUPS AND FEEDS

[75] Inventors: James R. Randall, Decatur, Ill.; Arling K. Langhurst, Fairfax; Herman H. Schopmeyer, Cedar Rapids, both of Iowa; Robert L. Seaton, Decatur, Ill.

[73] Assignee: Archer Daniels Midland Company, Decatur, Ill.

[21] Appl. No.: 817,488

[22] Filed: Jul. 20, 1977

[51] Int. Cl.² .............................................. C13L 1/00
[52] U.S. Cl. ......................................... 127/23; 127/68
[58] Field of Search ............................. 127/23, 68, 24

[56] References Cited

U.S. PATENT DOCUMENTS

| | | | |
|---|---|---|---|
| 240,907 | 5/1881 | Jebb | 127/68 |
| 327,035 | 9/1885 | Stiker | 127/68 |
| 3,251,717 | 5/1966 | Honeychurch | 127/68 |
| 3,595,696 | 7/1971 | Vegter | 127/23 |
| 3,637,399 | 1/1972 | Neel | 127/68 X |

Primary Examiner—Sidney Marantz
Attorney, Agent, or Firm—Plumley and Tyner

[57] ABSTRACT

Corn is steeped in a process in which corn is continuously added at the top of a cylinder of a height of at least 1.5 to 2.5 times its diameter, water is continuously circulated upward through downflowing corn. This water, comprising a combination of steep water moving with steeped corn together with fresh mill and water containing corn solubles, is continuously withdrawn from the top of the tank. A conical bottom of the tank of specific dimensions aids in the continuous down-flow of corn.

5 Claims, 1 Drawing Figure

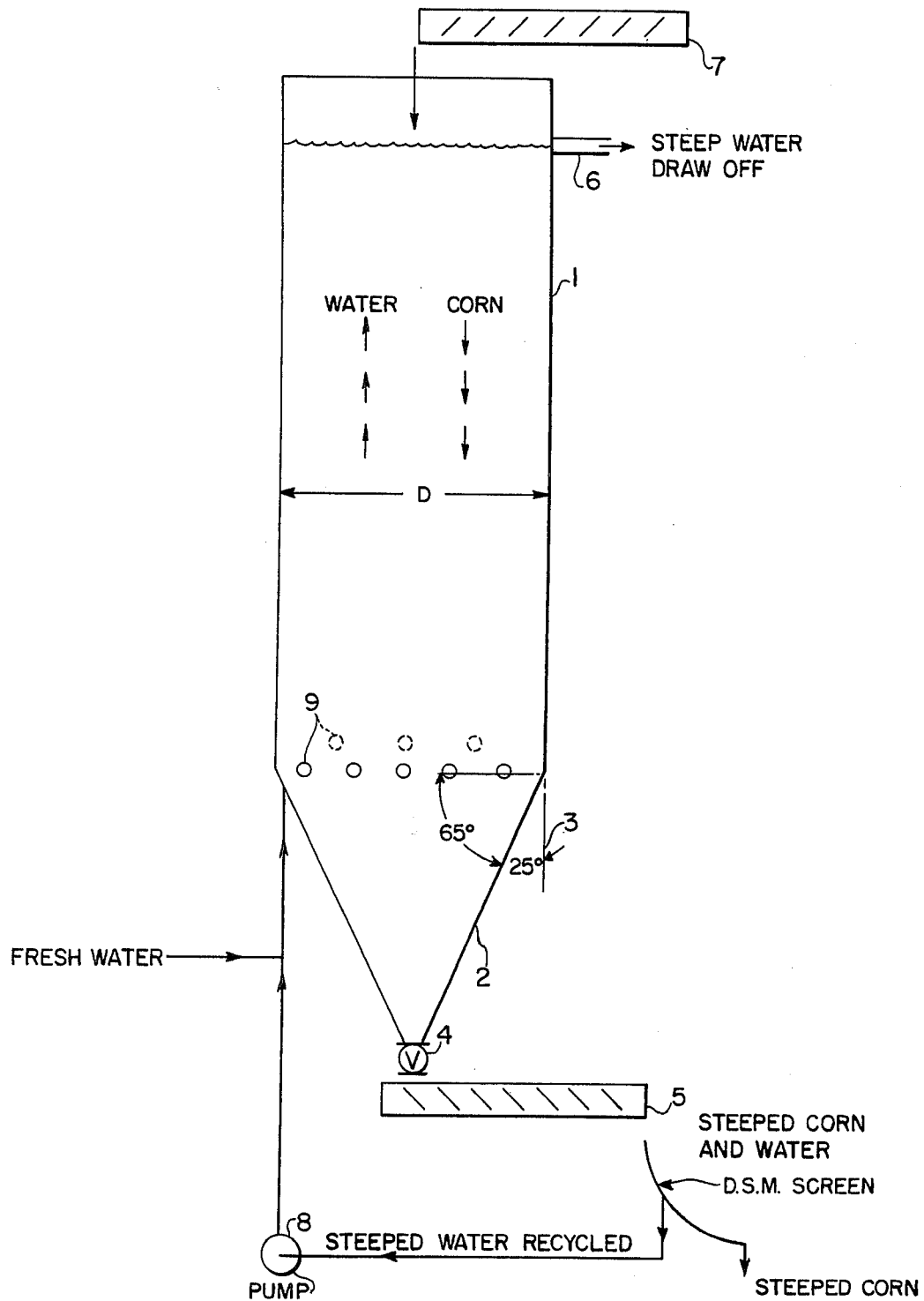

CONTINUOUS STEEPING OF CORN FOR WET PROCESSING TO STARCHES, SYRUPS AND FEEDS

In the processing of corn by wet milling it to starches, syrups, sugars and feeds, the cleaned corn is usually prepared for milling by soaking or steeping in an aqueous solution containing a small amount of sulfur dioxide and lactic acid. This steeping process has been carried out by many different variations of the same basic technique by different corn milling organizations. Fundamentally, the equipment employed usually consists of a number of tanks with pumps for recirculating the water directly from the bottom of the steep tank to the top from whence it descends through the corn and for discharging and advancing the water from tank to tank as the steeping process advances. In U.S. Pat. No. 3,595,696, for example, used steeping water is circulated back to an earlier tank in a line of tanks, the corn and steeping water both flowing from the top of the tanks to the bottom.

In the usual wet milling process, large amounts of water are required and fresh water is added only at the starch washing stage. This water, which may amount to about 11 gallons per bushel of corn processed, is usually advanced through the fiber wash, germ wash, etc. to the steep tanks, where additional sulfur dioxide is added to bring the sulfur dioxide content to about 0.15 to 0.25%. This water from the described process is commonly identified as mill water which is then added to the corn in the steep tanks in a counter flow system, that is, the water for steeping is added to the top of the tank wherein the corn has been steeped the longest, recycled for a time such as 2 to 4 hours, then added to the top of an earlier steep tank which contains the next longest steeped corn, etc. Ordinarily, the corn steeps are set up in batteries of about ten tanks each; thus the water advance from steep to steep counter flow (or backward, so to speak) until it has passed through the entire ten steeps. As is apparent, the corn is stationary whereas the water is moving from the last steep tank to the first.

In a typical system, 7 or 8 gallons of warm water are added per bushel to the corn in the steep. The corn quickly starts to absorb moisture and in 6–8 hours will reach a moisture content of 45 to 46%, which is the maximum it will absorb. To obtain adequate steeping, the corn is held in each tank for from 36 to 48 hours depending on type of corn, operating conditions, etc.

There are ordinarily no precise tests for adequacy of steeping. Operating personnel usually rely on softness and texture of the steeped kernels, which they have learned to judge by long experience. For more precise evaluations of steeping results, the soluble solids content of the steeped corn is important, also the ease with which starch is broken from fiber during milling and how readily and how completely the gluten can be removed from the starch, all being indications of the adequacy of steeping. The steeping operation also removes solubles and toughens the germ so it does not break up readily during milling.

The steeping operation is customarily carried out batchwise in large tanks holding perhaps 5,000–10,000 bushels of grain. These must be filled and emptied in sequence and considerable time is lost to the steeping operation. Filling and emptying a 5,000 bushel steep with corn may require from 2 to 4 hours and if a plant is grinding at a rate of 50,000 bushels/day, or approximately 2,100 bushels/hour, 2½ hours of time are required to empty the steep. Thus, it is apparent that from 4½ to 6½ hours time is lost to steeping on each 5,000 bushel tank of corn ground.

It is obvious that it would be desirable to fill and empty the steeps continuously, for this would not only minimize time lost in filling and emptying, but it would also reduce the amount of piping, valves and pumps necessary and greatly reduce labor to carry out the steeping operation. However, it has always been recognized that grain flowing into a storage bin or tank does not flow down uniformly but channels down through the center of the bin in an inverted cone effect, so that a large portion of the grain along the sides does not move. As a demonstration, when a quantity of white corn was placed on top of a 5,000 bushel steep of yellow corn which was being drawn off at the rate of 100 bushels/hour, in about 6 hours white corn appeared at the bottom discharge, indicating channeling. Because of such channeling, it has never been possible to steep corn on a continuous system, for part of the corn would flow through very quickly while a large portion would not move at all. Corn steeped in this fashion would be very unsatisfactory for milling.

We have discovered a method and apparatus whereby this channeling can be prevented and thereby have solved the basic problem of flowing the corn in a bin so that continuous steeping is possible with consequent substantial savings in time, energy and apparatus.

BRIEF DESCRIPTION OF DRAWING

The drawing is a sketch or flow sheet of the preferred arrangement of apparatus used in the process of our invention.

In order to cause the corn to flow down uniformly in the tank, the following features were found to be important:

1. A single outlet cone bottom tank should be used and the angle of the cone, i.e., the angle of repose of steeped corn in water, must be such that the corn will slide down freely and must be at 25° ± 3 degrees from the straight side.

2. The sides of the cone must be smooth and there must be no rough spots or welds which protrude to retard the flow of the corn.

3. There should be a substantial mass of corn above the discharge valve to insure mass flow. We established this to be at least 1.5 times the diameter of the tank in which the corn is being steeped and, preferably at least 2.5 times the steep tank diameter. As an example, for a 16 foot 6 inch tank, the height on the straight side, full of corn, should be at least 24 feet and preferably 40 feet.

4. The steeped corn should be drawn off through a rotary valve on the bottom of the cone, along with a substantial proportion of water. This is particularly important for the water has a buoyant effect on corn, and being drawn off with it helps keep the corn moving uniformly down the sides of the cone.

A typical example showing the ratio of steeped corn to water as it was removed was:

| | |
|---|---|
| Wet corn weight | 585 grams |
| Free water weight | 330 grams |
| Steeped corn volume | 760 c.c. |
| Corn and water volume | 820 c.c. |

5. The corn to be steeped should be spread uniformly over the top of the steep to prevent its piling in one area and thus failing to flow down uniformly.

6. Process water containing approximately 0.2% sulfur dioxide at a rate of approximately 7 gallons per bushel is added to the water drained from the corn, heated to 125° F, and pumped into the bottom of the steep tank substantially at the junction of the cone with the straight side of the tank, preferably with a minimum of eight inlets.

The apparatus used in practicing our invention can comprise the following which is described with reference to the drawing.

Equipment a. Steep tank 1, 16 foot 6: diameter 35 feet on straight side with cone bottom 2 having an angle 3 of 25°.

b. A motorized rotary valve 4 capable of handling 100 bushels of steeped corn per hour with carrying water.

c. A de-watering screen 5 capable of removing the free water from the steeped corn being removed. A screen bend commonly identified as a Dutch States Mine screen with slots was very satisfactory.

d. A suitable water draw off 6 at the top of the tank 1 to remove the light steep water from the system.

e. An automatic grain spreader 7 at the top of the tank 1 to spread the grain uniformly over the top of the steep.

f. A centrifugal pump 8 capable of handling both the water drained from the corn and additional mill water used.

g. Preferably eight equally spaced inlets to the steep tank at the junction of the cone and straight side 9.

EXAMPLE

A 16½ × 35 ft. steep tank was filled with dry corn and steeped for 42 hours in the conventional fashion to start the system. Then dry corn was fed in at the top, at the rate of 100 bushels per hour and an equivalent quantity drawn off the bottom along with the carrying water.

This amounts to a flow per hour approximately as follows:

| | |
|---|---|
| 15.5% moisture corn in | 5600 lb. per hr. |
| Dry solids corn in | 4732 lb. per hr. |
| 45% moisture steeped corn (dry solids) | 4432 lb. per hr. |
| Water drained from corn | 4868 lb. per hr. |
| Light steep water Off top of steep | 2813 lb. per hr. |
| Corn Solubles in steep water | 300 lb. per hr. |

Along with the steeped corn drawn off the bottom there was considerable free water which was found to be about 330 cc per 585 grams of 45% moisture corn or about 4 gallons per bushel of steeped corn. This free water was drained from the corn and returned to the steep tank along with 7 gallons of fresh mill water per bushel of fresh corn added to the system, the water containing 0.2% sulfur dioxide all heated to 125°. This mill water and free water was returned to the steep tank at the junction of the cone and straight side of the steep tank through 8 equally spaced inlets. At the same time, light steep water was drawn off the top of the tank.

To demonstrate that the system was functioning satisfactorily, a few bushels of white corn were distributed over the top surface of the steep tank, and the rate observed at which the white corn came through the system. The white corn started appearing at approximately 45 hours and continued for about 4 hours, indicating good mass flow and a minimum of channeling.

A series of samples of steep water and of steeped corn from both batch and continuous steeping were analyzed and the results were as follows, indicating good agreement between the two methods.

| | Continuous Steeping | Batch Steeping |
|---|---|---|
| Water temperature | 124° F | 122° F |
| Water temperature out | 125 | 123 |
| Sulfur Dioxide | 0.2% | 0.2% |
| Hours steeping | 48 | 46 |
| Corn moisture in | 15.5% | 15.5% |
| Corn moisture out | 45.2% | 45.0 |
| Solubles in steeped corn | 1.9% | 1.8% |
| Steep water | | |
| Acidity (normality) | 0.26 | 0.27 |
| Protein (dry basis)-% | 47.3 | 50.4 |
| Solids -% | 4.2 | 5.5 |
| pH | 4.10 | 4.07 |
| Sulfur dioxide -% | 0.069 | 0.079 |

We do not limit ourselves to steep tanks of the size as indicated, but the relative dimensions as indicated will apply to any size tanks. For example, we could set up a tank with such dimensions as 30 ft. in diameter by 72 ft. high, which would hold approximately 660 bushels unsteeped corn per foot of height. Such a system could have approximately 1000 bushels unsteeped corn per hour and provide 48 hours steeping time. While the best milling results are obtained with approximately 48 hours' steeping, there are conditions under which shorter steeping time will suffice, and it is possible to use this same system for any other steeping time; such as, 36 hours, 40 hours, and the like.

Likewise, the sulfur dioxide content of the mill water used in steeping can be varied considerably and there are claims that it can range from 0.1% to 0.3% but for the most part, approximately 0.2% is considered optimum for good steeping results. The steeping temperature can also vary somewhat such as from 110° F to 135° F, lower steeping temperature retards the rate of softening of the corn, while excessively high temperature might cause pasting of the starch in the corn and affect the separation of starch and gluten. The amount of mill water added to the corn can vary considerably depending on the opinion of the operating personnel, the type of equipment used in milling and processing of the starch and gluten and the moisture content of the corn to be processed.

We claim:

1. A process for steeping corn which comprises
    a. filling a cylindrical tank having a conical bottom with corn and water,
    b. steeping the corn in said tank for about 36 to 48 hours at a temperature of 110° to 135° F,
    c. then continuously passing corn into the top of said tank and continuously removing steeped corn and steep water from an outlet in the bottom of said conical bottom,
    d. recovering the steeped corn,
    e. recycling said removed steep water together with fresh water as a combined water in countercurrent flow to descending corn, said combined water being introduced into said tank at a plurality of inlets near the junction of the vertical walled portion of the tank with the conical bottom; and
    f. continuously withdrawing water containing corn solubles from the top of said tank, said conical bottom having an angle of 22° to 28° from the vertical side of said tank, the height of said tank being from 1.5 to 2.5 times its diameter above said conical bottom.

2. The process of claim 1 in which the corn to be steeped is spread uniformly over the top of the steep.

3. The process of claim 1 in which sulfur dioxide is added to the water which is passed into the bottom of the cylindrical tank.

4. The process of claim 1 in which fresh mill water is added to the bottom of the cylindrical tank at a rate of about 7 gallons per bushel of input corn.

5. An apparatus for steeping corn comprising a cylindrical tank having a cone bottom, the cone having an angle of 22°-28° from the vertical and a controllable outlet at the bottom of the cone and said tank having a plurality of inlets approximately at the junction of the cone with the straight sides of the tank, means for removing corn and water at the bottom of the cone and means for passing said removed water into said inlets and means for removing water from near the top of said vertical tank, the height of the cylindrical tank being about 1.5 to 2.5 times its diameter.

* * * * *